United States Patent
Sommers et al.

(10) Patent No.: US 10,241,798 B2
(45) Date of Patent: Mar. 26, 2019

(54) TECHNIQUE FOR REDUCING VOLTAGE DROOP BY THROTTLING INSTRUCTION ISSUE RATE

(71) Applicant: NVIDIA CORPORATION, Santa Clara, CA (US)

(72) Inventors: Peter Sommers, Santa Clara, CA (US); Peter Nelson, San Francisco, CA (US); Aniket Naik, Sunnyvale, CA (US); John H. Edmondson, Arlington, MA (US)

(73) Assignee: NVIDIA CORPORATION, Santa Clara, CA (US)

(*) Notice: Subject to any disclaimer, the term of this patent is extended or adjusted under 35 U.S.C. 154(b) by 805 days.

(21) Appl. No.: 14/033,378

(22) Filed: Sep. 20, 2013

(65) Prior Publication Data
US 2015/0089198 A1    Mar. 26, 2015

(51) Int. Cl.
*G06F 9/38* (2018.01)

(52) U.S. Cl.
CPC .................. *G06F 9/3836* (2013.01)

(58) Field of Classification Search
CPC ........ G06F 9/00–9/3897; G06F 9/3836; G06F 1/32–1/3296
USPC ....................... 712/214, 215, 227
See application file for complete search history.

(56) References Cited

U.S. PATENT DOCUMENTS

| | | | | |
|---|---|---|---|---|
| 6,636,976 B1 * | 10/2003 | Grochowski | ............. | G06F 1/28 713/320 |
| 6,826,704 B1 * | 11/2004 | Pickett | .................. | G06F 1/3203 712/E9.029 |
| 2003/0126476 A1 * | 7/2003 | Greene | ................. | G06F 1/3203 713/300 |
| 2005/0081073 A1 * | 4/2005 | Williams | ............ | G06F 9/30076 713/320 |
| 2006/0206740 A1 * | 9/2006 | Hurd | ..................... | G06F 1/3203 713/322 |
| 2008/0109634 A1 * | 5/2008 | Chrysos | ................ | G06F 1/3203 712/1 |
| 2009/0063884 A1 * | 3/2009 | Weekly | ................. | G06F 1/3203 713/340 |
| 2009/0300329 A1 * | 12/2009 | Naffziger | .............. | G06F 1/3203 712/205 |
| 2012/0221871 A1 * | 8/2012 | Suryanarayanan | ... | G06F 1/3243 713/320 |

(Continued)

*Primary Examiner* — Keith E Vicary
(74) *Attorney, Agent, or Firm* — Artegis Law Group, LLP

(57) ABSTRACT

An issue control unit is configured to control the rate at which an instruction issue unit issues instructions to an execution pipeline in order to avoid spikes in power drawn by that execution pipeline. The issue control unit maintains a history buffer that reflects, for N previous cycles, the number of instructions issued during each of those N cycles. If the total number of instructions issued during the N previous cycles exceeds a threshold value, then the issue control unit throttles the instruction issue unit from issuing instructions during a subsequent cycle. In addition, the issue control unit increases the threshold value in proportion to the number of previously issued instructions and based on a variety of configurable parameters. Accordingly, the issue control unit maintains granular control over the rate with which the instruction issue unit "ramps up" to a maximum instruction issue rate.

21 Claims, 6 Drawing Sheets

(56) References Cited

U.S. PATENT DOCUMENTS

| | | | | |
|---|---|---|---|---|
| 2012/0254595 A1* | 10/2012 | Wu | ................... | G06F 1/3203 |
| | | | | 712/208 |
| 2013/0124900 A1* | 5/2013 | Emberling | ............ | G06F 9/3836 |
| | | | | 713/340 |
| 2013/0262831 A1* | 10/2013 | Nelson | ................... | G06F 9/30 |
| | | | | 712/215 |

* cited by examiner

TECHNIQUE FOR REDUCING VOLTAGE DROOP BY THROTTLING INSTRUCTION ISSUE RATE

BACKGROUND OF THE INVENTION

Field of the Invention

Embodiments of the present invention relate generally to computer system power supply and, more specifically, to a technique for reducing voltage droop by throttling instruction issue rate.

Description of the Related Art

When a conventional computer chip is powered on, an instruction issue unit within the computer chip typically initiates processing by fetching instructions from memory and then issuing those instructions to execution units within the chip. When the execution units begin executing those instructions, the chip begins to draw increasing amounts of power from a power supply.

If the instruction issue unit issues a significant number of instructions over a short period of time, then the computer chip may suddenly draw an increased amount of current in order to power the execution units. In turn, the voltage provided by the power supply may suddenly decrease. This phenomenon is known in the art as "voltage droop."

Voltage droop can be problematic because modern computer chips require at least a minimum amount of voltage in order to function properly. If the supply voltage droops below that minimum amount, then the computer chip may not operate with peak performance or, worse yet, may fail to operate entirely.

Accordingly, what is needed in the art is a technique for reducing the incidence of voltage droop in computer chips.

SUMMARY OF THE INVENTION

One embodiment of the present invention sets forth a computer-implemented method for controlling the rate at which an instruction issue unit issues instructions to an execution pipeline, including determining a first integer value that reflects a number of instructions issued by the instruction issue unit to the execution pipeline during a first cycle associated with the instruction issue unit, pushing the first integer value onto a history buffer that stores a plurality of integer values, where each integer value stored in the history buffer indicates a number of instructions issued by the instruction issue unit to the execution pipeline during a different previous cycle, determining that a sum of the integer values stored in the history buffer exceeds a first threshold value, and preventing the instruction issue unit from issuing instructions during a second cycle associated with the instruction issue unit.

One advantage of the disclosed technique is that the number of instructions allowed to be issued to the execution pipeline is gradually increased to a maximum value, thereby avoiding voltage droop that could be caused by the sudden execution of many instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
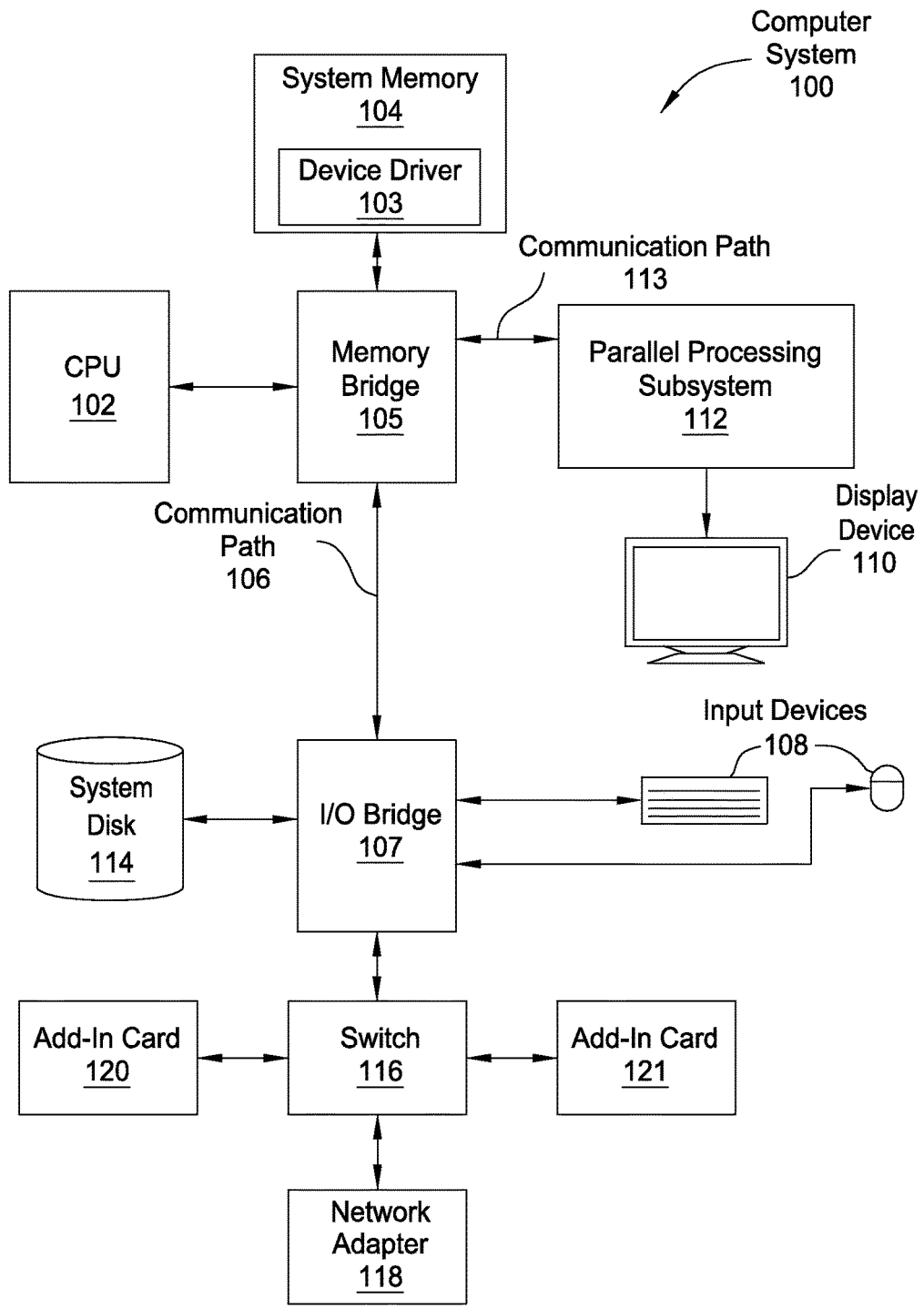
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
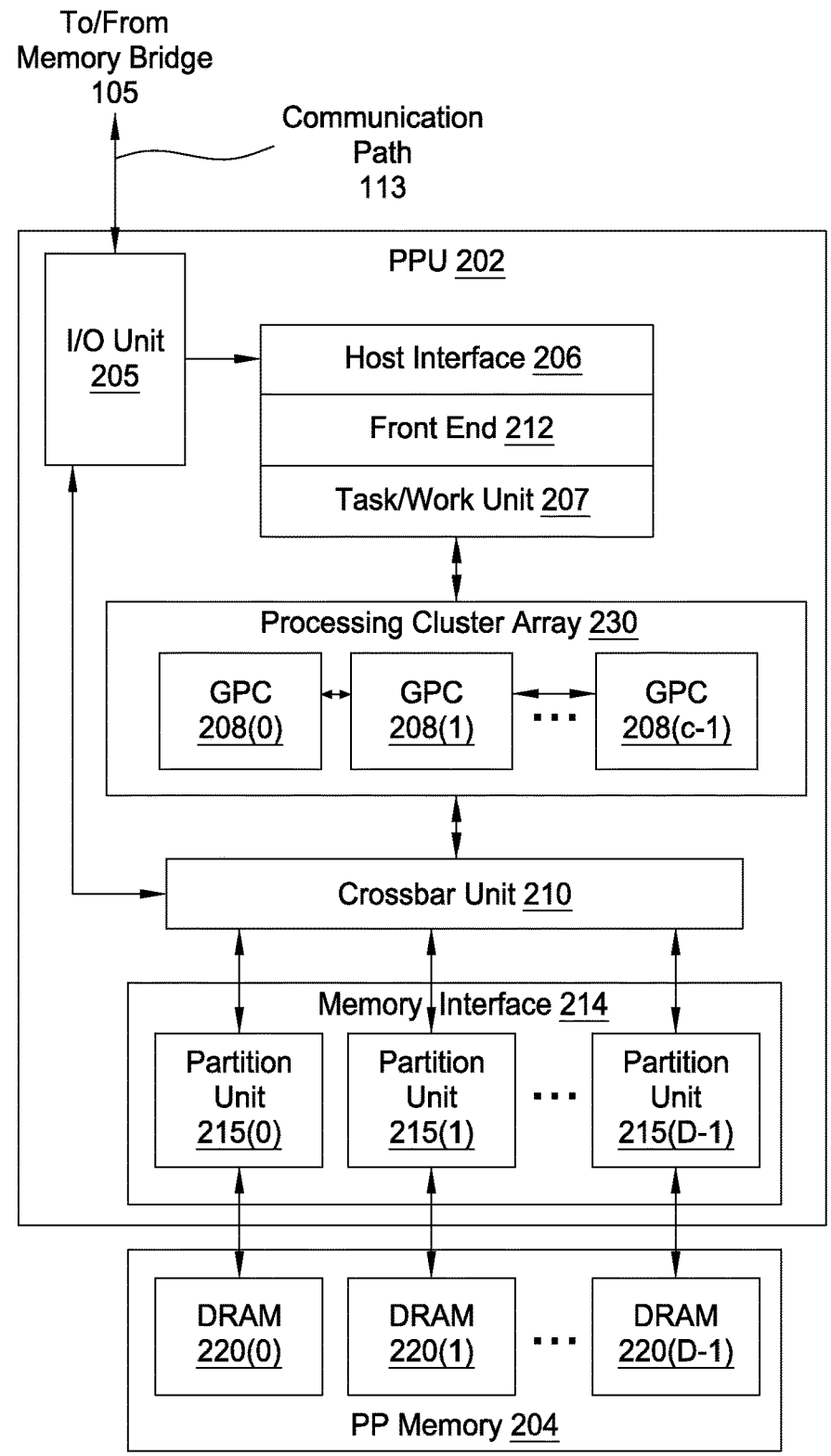
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Reducing Voltage Droop by Throttling Instruction Issue Rate

Referring generally to FIGS. 1-2, different elements within those figures may include one or more execution pipelines configured to execute a sequence of program instructions. For example, CPU 102 of FIG. 1 could include a pipeline of execution units that, when provided with a stream of program instructions, executes those instructions sequentially. In another example, one of the GPCs 208 within PPU 202 of FIG. 2 could include a collection of processing engines, where each processing engine could include a different execution pipeline. Those different execution pipelines could execute the same or different instruction streams in parallel with one another.

In general, a given execution pipeline is coupled to an instruction issue unit residing upstream of the execution pipeline and configured to provide an instruction stream to that execution pipeline. Additionally, each such instruction issue unit may be coupled to an issue control unit configured to control the rate with which instructions are issued to the execution pipeline. The issue control unit is configured to slowly allow the instruction issue unit to "ramp up" to a maximum rate of issuing instructions. By controlling the instruction issue rate in this fashion, the issue control unit may reduce the occurrence of sudden spikes in power draw, thereby reducing or eliminating voltage droop. An exemplary instruction issue unit and exemplary issue control unit are described in greater detail below in conjunction with FIG. 3.

Figure 3:
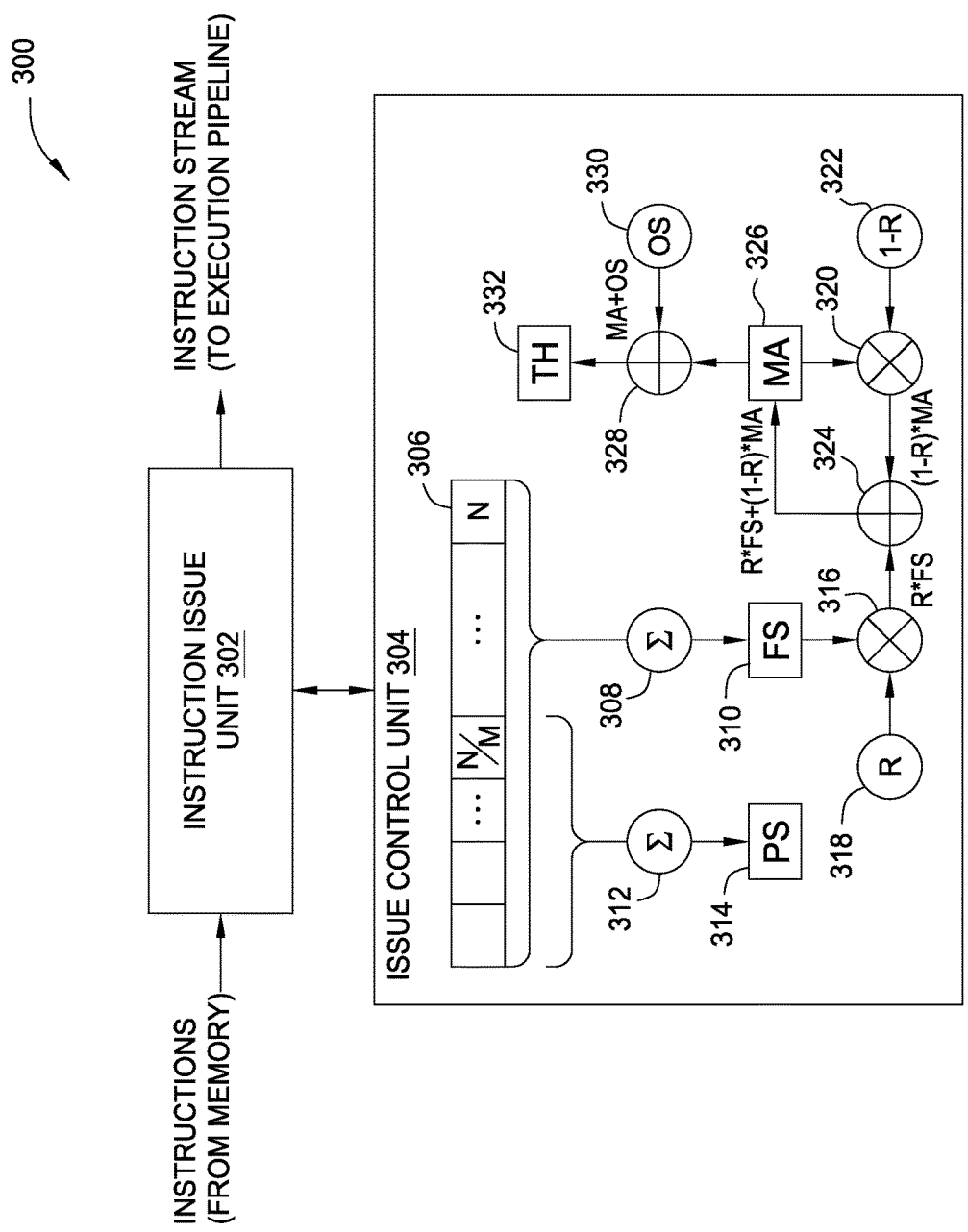
FIG. 3 is a block diagram of a subsystem that is configured to reduce the incidence of voltage droop in a computer chip, according to one embodiment of the present invention.

FIG. 3 is a block diagram of a subsystem that is configured to reduce the incidence of voltage droop in a computer chip, according to one embodiment of the present invention. Subsystem 300 is configured to reduce the incidence of voltage droop by controlling the rate with which instructions are issued to an execution pipeline. Subsystem 300 could be included within computer system 100 shown in FIG. 1 or within PPU 202 shown in FIG. 2. As a general matter, subsystem 300 may be associated with any execution pipeline included within any processing element of FIG. 1 or 2.

As shown, subsystem 300 includes an instruction issue unit 302 configured to read instructions from memory (not shown) and to issue those instructions, as an instruction stream, to an execution pipeline (also not shown). The memory could be system memory 104 of FIG. 1 or PP memory 204 of FIG. 2, while the execution pipeline could reside within CPU 102 or PPU 202. Instruction issue unit 302 is coupled to an issue control unit 304 that is configured to control the rate with which instruction issue unit 302 issues instructions to the execution pipeline. In particular, issue control unit 304 may temporarily throttle instruction issue unit 302 from issuing instructions under specific circumstances. As described in greater detail herein, issue control unit 304 is configured to cause instruction issue unit 302 to slowly increase the rate with which instruction issue unit 302 issues instructions in order to avoid voltage droop. In doing so, issue control unit 304 causes instruction issue unit to "spread out" instruction issues and, thus, current and/or power ramp up, thereby reducing voltage droop.

Issue control unit 304 includes a history buffer 306 that includes N different entries, where each entry corresponds to a different previous cycle of instruction issue unit 302. A given entry stores the number of instructions issued by instruction issue unit 302 during the corresponding previous cycle. Accordingly, history buffer 306 stores an N-cycle history of the number of instructions issued during each of those N cycles. N may be any positive integer, although in practice, N has a default value of 24. For a given cycle, issue control unit 304 determines the number of instructions issued by instruction issue unit 302 in that cycle, and then pushes that number of instructions onto history buffer 306. Issue control unit 304 also removes the oldest entry from history buffer 306, so that history buffer 306 always includes just N entries. In one embodiment, history buffer 306 is a first-in first-out (FIFO) buffer, and issue control unit 304 pushes a new entry onto history buffer 306 while also popping the oldest entry from history buffer 306. Although history buffer 306 is updated at each cycle, other elements within issue control unit 304 may be updated less frequently, i.e. after a given interval that includes any number of cycles, as described in greater detail below.

Issue control unit 304 includes various circuitry configured to analyze the entries of history buffer 306 and then determine whether instruction issue unit 302 should be throttled from issuing instructions during a subsequent cycle. History buffer 306 is coupled to a sum unit 308 that, in turn, is coupled to a full sum (FS) 310. Sum unit 308 is configured to populate FS 310 with the total number of instructions issued during the previous N cycles. FS 310 may be a register or another memory element suitable for temporarily storing numerical values.

Once FS 310 has been updated, issue control unit 304 compares FS 310 to a threshold (TH) 332. TH 332 stores a value that reflects the maximum number of instructions that may be included within history buffer 306 before issue control unit 304 throttles instruction issue unit 302. When FS 310 exceeds TH 332, issue control unit 304 throttles instruction issue unit 302 from issuing instructions in a subsequent cycle. With this approach, issue control logic 304 may limit the total number of instructions issued across an N-sized interval, thereby distributing current/power ramp up over a longer time period. Like FS 310, TH 332 may be a register or another memory element suitable for temporarily storing numerical values.

History buffer 306 is also coupled to a sum unit 312 that, in turn, is coupled to a partial sum (PS) 314. Sum unit 312 is configured to populate PS 314 with the total number of instructions issued during the previous N/M cycles of instruction issue unit 302, where M is a positive integer that is less than N. In practice, M has a default value of 4, although sum unit 312 may compute a partial sum for PS 314 across any portion of history buffer 306. In addition, M generally is an even divisor of N in order simplify the computation of WM. PS 314 may be a register or another memory element suitable for temporarily storing numerical values.

Once PS 314 has been updated, issue control unit 304 compares PS 314 to TH divided by M (TH/M), TH/M reflects the maximum number of instructions that may be included within the N/M most recent entries of history buffer 306 before issue control unit 304 throttles instruction issue unit 302. Issue control unit 304 may store TH/M within a register or similar memory element, or may compute TH/M as needed. When PS 314 exceeds TH/M, issue control unit 304 throttles instruction issue unit 302 from issuing instructions during a subsequent cycle. With this approach, issue control logic 304 may limit "bursts" of instructions from being issued within a recent N/M-sized interval and, instead, cause those instructions to be distributed across an N sized interval, as described in greater detail below.

As a practical example of the above approach, suppose that N=16, M=4, TH=8, and TH/M=2. Without implementing PS 314 in the fashion described above, instruction issue unit 302 could issue a burst of 8 sequential instructions across 8 consecutive cycles within an N-sized interval. This burst could cause voltage droop. However, by implementing PS 314 as described above, issue control unit 304 would limit instruction issue unit 302 from issuing more than 2 instructions within any 4 consecutive cycles. Thus, instead of issuing the burst of 8 instructions consecutively, instruction issue unit 302 could only issue 2 instructions consecutively, interleaved with cycles where no instructions were issued. Issue control unit 304 would thus distribute the 8 instruction issues across 16 cycles, thereby reducing the rate of current/power ramp-up. With this approach, voltage droop potentially caused by bursts of instructions may be avoided.

Issue control unit 304 may thus throttle instruction issue unit 302 from issuing instructions during a subsequent cycle via two separate approaches that are applicable under different conditions. With the first approach, issue control unit 304 throttles instruction issue unit 302 when FS 310 exceeds TH 332. With the second approach, issue control unit 304 throttles instruction issue unit 302 when PS 314 exceeds TH/M. By implementing these two approaches in conjunction with one another, issue control unit 304 may prevent instruction issue unit 302 from (i) issuing too many instructions over an N-cycle interval and (ii) from issuing bursts of instructions within that N-cycle interval that occur within the most recent N/M cycles.

Issue control unit 304 is also configured to update the value stored by TH 332 based on a moving average of the number of instructions issued during the previous N cycles. Issue control unit 304 stores that moving average as MA 326. An add unit 328 is configured to populate TH 332 by adding an offset value (OS) 330 to MA 326. OS 330 stores a configurable value that is typically small, e.g. between 1 and 4.

Issue control unit 304 may thus continually update TH 332 in order to gradually increase the number of instructions that instruction issue unit 302 is allowed to issue. Issue control unit 304 performs those updates based on (i) the current average number of instructions associated with history buffer 306, as stored by MA 326, and (ii) the small value stored by OS 330. By slowly increasing the allowable number of instructions in this fashion, issue control unit 304 slowly increases the current that is drawn by the execution pipeline, potentially avoiding voltage droop. The approach described thus far is also described in greater detail below in conjunction with FIG. 5.

Issue control unit 304 is configured to update TH 332 during each cycle or during every P cycles (i.e., an interval that includes P cycles), where P is a positive integer. P could be, e.g., 4, and issue control unit 304 would thus update TH 332 every 4th cycle of instruction issue unit 302. When updating TH 332 during a given $P^{th}$ cycle, issue control unit 304 updates MA 326 based on the current values of FS 310 and MA 326, as well as corresponding contribution factors R 318 and 1-R 322. R 318 is a configurable value that indicates a fraction of FS 310 to be used in computing an updated value of MA 326, 1-R 322 indicates a fraction of the current value of MA 326 to be used in computing the updated value of MA 326. Add unit 324 combines these two different fractions to generate the updated value of MA 326. As is shown, add unit 324 computes the updated value of MA 326 as R*FS+(1−R)*MA, where multiply unit 316 computes R*FS and multiply unit 320 computes (1−R)*MA. One approach for updating MA 326 and TH 332 is described in greater detail below in conjunction with FIG. 5.

As mentioned above, R 318 is configurable, and may be specifically adjusted to control the rate with which TH 332 is allowed to increase. At one extreme, if R were configured to equal zero, then MA 326 would always equal the previous value of MA 326, and TH 332 could only increase by MA 326 plus OS 330 during every $P^{th}$ cycle. Such a configuration may result in a relatively long "ramp up" period. At the opposite extreme, if R were configured to equal one, then MA 326 would always equal the current value of FS 310 and TH 332 could increase by FS 310 plus OS 330 every $P^{th}$ cycle. Such a configuration may result in a relatively short "ramp up" period. R 318 may thus be tuned to achieve different types of performance. In practice, R is typically set to ½ so that MA 326 is computed based on equal contributions from FS 310 and the previous value of MA 326.

In some situations, instruction issue unit 302 may suddenly stop issuing instructions for a period of time, and then suddenly begin issuing instructions again. Without issue control unit 304, such intermittent periods of inactivity could potentially cause the execution pipeline to suddenly draw excessive power when instruction issue unit 302 begins issuing instructions again, potentially causing voltage droop.

However, issue control unit 304 is configured to implement three different techniques to adjust the rate of growth of TH 332, thereby limiting the number of instructions that may be issued following an intermittent period of inactivity. With these three techniques, described below, issue control unit 304 may slowly cause instruction issue unit 302 to again "ramp up" to a maximum rate of issuing instructions.

Issue control unit 304 implements the first of the aforementioned three techniques upon determining that the number of instructions issued during a previous cycle is less than the value stored by MA 326. When implementing the first technique, issue control unit 304 sets the contribution factor R 318 to equal one. With R 318 equal to one, issue control unit 304 computes future values of MA 326 to be equal to FS 310, thereby effecting a relatively quick "ramp down" period. Accordingly, during subsequent cycles, TH 332 only reflects the value of FS 310 plus OS 330.

Issue control unit 304 may also implement the second technique of the aforementioned three techniques upon determining that the number of instructions issued during a previous cycle is less than the value stored by MA 326, similar to above. When implementing the second technique, issue control unit 304 sets OS 330 to equal zero. As such, during subsequent cycles, TH 332 only reflects the value of FS 310. Issue control unit 304 may implement these two techniques alone or in conjunction with one another in order to limit the growth of TH 332.

Issue control unit 304 implements the third of the aforementioned three techniques upon determining that the number of instructions issued during a previous cycle is less than the value stored by MA 326 by a threshold amount. That threshold amount is referred to hereinafter as a "drop threshold." If the number of instructions issued during the cycle falls below MA 326 by greater than the drop threshold, then instruction issue unit 302 has decreased the rate with which instructions are being issued by a significant amount. To account for this sharp decrease in instruction issues, issue control unit 304 immediately resets MA 326 to zero, effectively causing TH 332 to decrease dramatically. When implementing the third technique described herein, issue control unit 304 causes instruction issue unit 302 to repeat the initial "ramp up" period. The three aforementioned techniques for adjusting the rate of growth of TH 332 are described in greater detail below in conjunction with FIG. 6.

As a general matter, the techniques described herein may be implemented during every cycle of instruction issue unit 302 or during different cycles. For example, issue control unit 304 could update history buffer 306 during a given cycle, and then update different stored values (e.g., FS 310, PS 314, etc.) during a subsequent cycle. Persons skilled in the art will recognize that the techniques described herein may be implemented with appropriate timing in order to achieve the general scope and spirit of the present invention.

Figure 4:
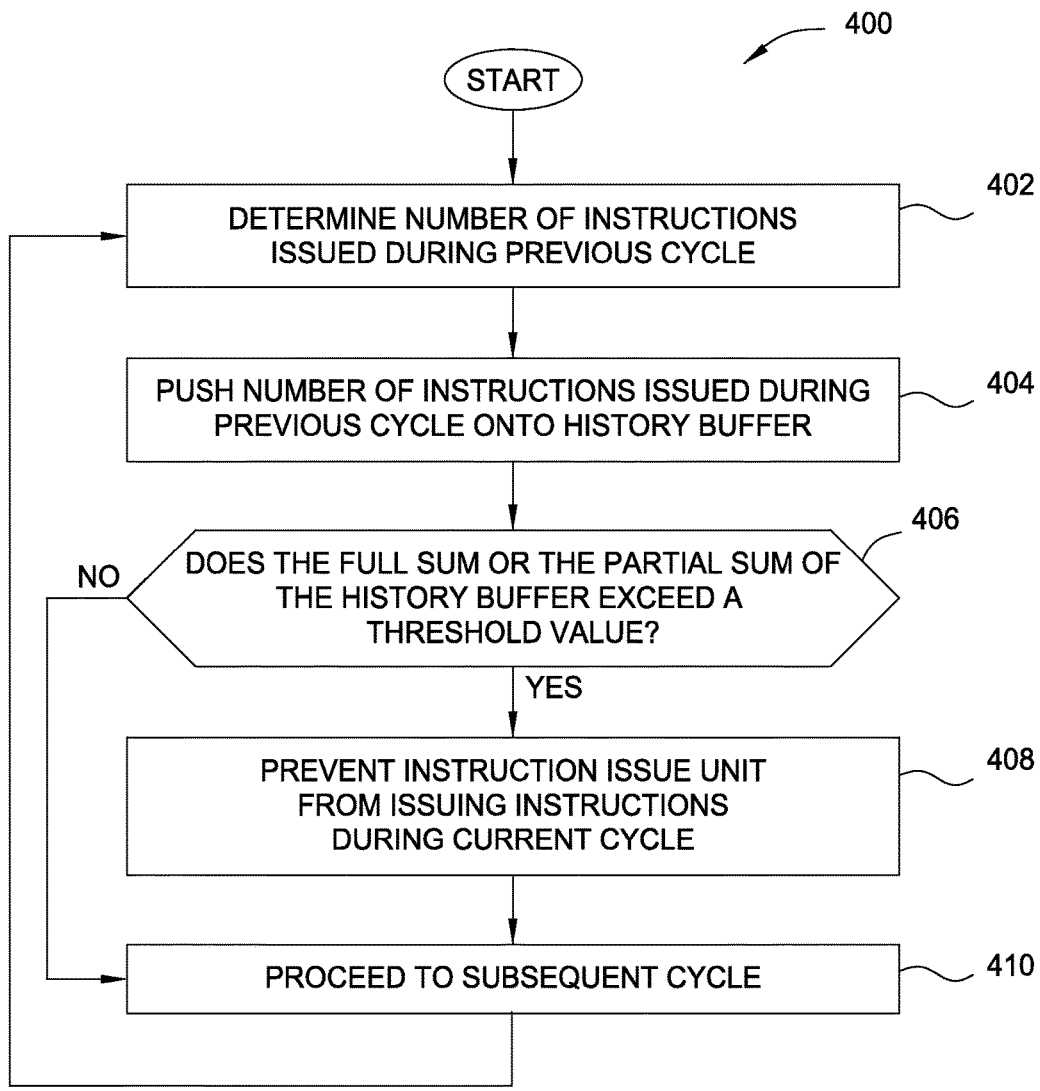
FIG. 4 is a flow diagram of method steps for controlling the rate with which instructions are issued to an execution pipeline, according to one embodiment of the present invention.

FIG. 4 is a flow diagram of method steps for controlling the rate with which instructions are issued to an execution pipeline, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where issue control unit 304 determines the number of instructions issued by instruction issue unit 302 during the previous cycle of instruction issue unit 302. At step 404, issue control unit 304 pushes the number of instructions issued during the previous cycle onto history buffer 306. Issue control unit 304 may also pop the oldest value from history buffer 306.

At step 406, issue control unit 304 determines whether FS 310 exceeds TH 332 or PS 314 exceeds TH/M. FS 310 stores the total number of instructions issued during the previous N cycles, while PS 314 stores the total number of instructions issued during the previous N/M cycles. If issue control unit 304 determines that FS 310 exceeds TH 332 or that PS 314 exceeds TH/M, then the method 400 proceeds to step 408. At step 408, issue control unit 304 throttles instruction issue unit 302 from issuing instructions during a subsequent cycle. The method 400 then proceeds to step 410. At step 410, instruction issue unit 302 proceeds to the subsequent cycle. The method may then repeat any number of times for any number of subsequent cycles.

If at step 406 issue control unit 304 determines that FS 310 does not exceed TH 332 and PS 314 does not exceed TH/M, then the method proceeds directly to step 410, described above.

By implementing the method 400, issue control unit 304 is capable of limiting the number of instructions that may be issued over different time intervals, thereby controlling the voltage drawn by the execution pipeline configured to execute those instructions based on the number of previously issued instructions. Accordingly, issue control unit 304 may avoid situations that would result in voltage droop. Issue control unit 304 is also configured to update the threshold number of instructions that may be issued during a given cycle by implementing a technique described in greater detail below in conjunction with FIG. 5.

Figure 5:
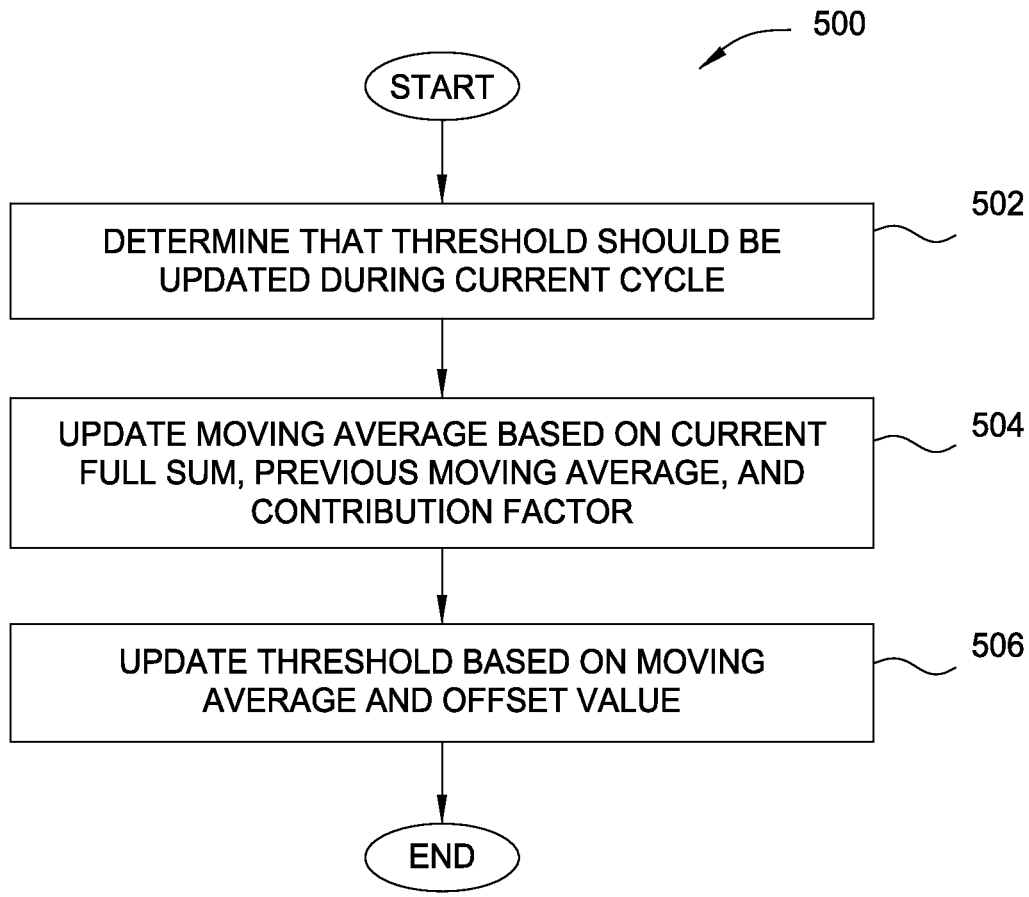
FIG. 5 is a flow diagram of method steps for updating a threshold value for issuing instructions to an execution pipeline, according to one embodiment of the present invention.

FIG. 5 is a flow diagram of method steps for updating a threshold value for issuing instructions to an execution pipeline, according to one embodiment of the present invention. Although the method steps are described in conjunction with the systems of FIGS. 1-3, persons skilled in the art will understand that any system configured to perform the method steps, in any order, is within the scope of the present invention.

As shown a method 500 begins at step 502, where issue control unit 304 determines that TH 332 should be updated during a current cycle. At step 504, issue control unit updates MA 326 based on FS 310, a previous value of MA 326, and a contribution factor R 318. In one embodiment, issue control unit 304 updates MA 326 by computing R*FS+(1−R)*MA. At step 506, issue control unit 504 updates TH 332 based on the value of MA 326 computed at step 504 and based on OS 330.

Issue control unit 304 may implement the method 500 at each different cycle in order to continuously update TH 332. Alternatively, issue control unit 304 may be configured to update TH 332 every P cycles, where P is a positive integer value. P is a configurable parameter, although in practice, P is equal to 4. As a general matter, P may control the speed with which issue control unit 304 allows instruction issue unit 302 to "ramp up" to a maximum instruction issue rate.

In various situations, instruction issue unit 302 may suddenly issue very few instructions. In these situations, issue control unit 304 implements three techniques for quickly reducing the number of instructions that may be issued by instruction issue unit 302, as described in greater detail below in conjunction with FIG. 6.

Figure 6:
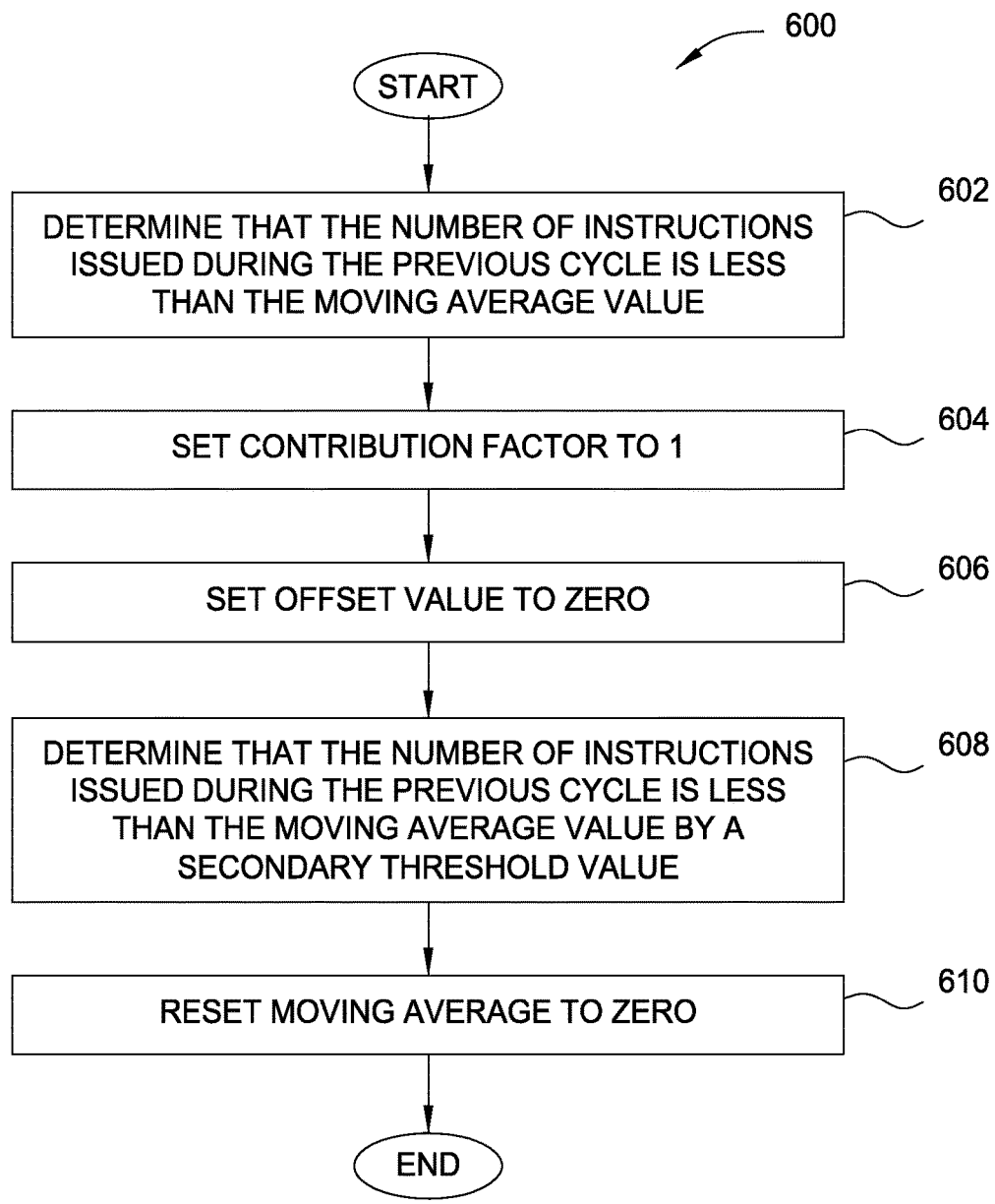
FIG. 6 is a flow diagram of method steps for adjusting the number of instructions allowed to issue to an execution pipeline, according to one embodiment of the present invention.

FIG. 6 is a flow diagram of method steps for adjusting the number of instructions allowed to issue to an execution pipeline Although the method steps are described in conjunction with the systems of FIGS. 1-3, persons skilled in the art will understand that any system configured to perform the method steps, in any order, is within the scope of the present invention.

As shown, a method 600 begins at step 602, where issue control unit 304 determines that the number of instructions issued during a previous cycle is less than the value stored by MA 326. At step 604, issue control unit 304 sets the contribution factor R 318 to one, thereby implementing the first of the three aforementioned techniques for adjusting the rate of growth of TH 332. As mentioned above, with R 318 equal to one, issue control unit 304 computes future values of MA 326 to be equal to FS 310. At step 606, issue control unit 304 sets the offset value OS 330 to equal zero, thereby implementing the second of the three aforementioned techniques for adjusting the rate of growth of TH 332. With OS 330 equal to zero, during subsequent cycles, TH 332 only reflects the value of FS 310.

At step 608, issue control unit 304 determines that the number of instructions issued during the previous cycle is less than the value stored by MA 326 by a threshold value, referred to herein as the "drop threshold." If the number of instructions issued during the cycle falls below MA 326 by greater than the drop threshold, then instruction issue unit 302 has decreased the rate with which instructions are being issued by a significant amount. At step 610, issue control unit 304 resets MA 326 to zero to account for this sharp decrease in instruction issues. In performing step 610, issue control unit 304 implements the third of the three aforementioned techniques for adjusting the rate of growth of TH 332. Issue control unit 304 thus causes instruction issue unit 302 to repeat the initial "ramp up" period.

The three techniques for adjusting the rate of growth of TH 332 described above in conjunction with steps 604, 606, and 610 may be implemented independently or in conjunction with one another. Additionally, various parameters associated with these three techniques may be modified, as needed, to achieve a specific type of performance. For example, in performing step 604, issue control unit 304 could set the contribution factor R 318 to any particular value in order to achieve specific performance. Likewise, in performing step 606, issue control unit 304 could set offset value OS 330 to any particular value to achieve a specific type of performance, and so forth in regard to step 610.

In sum, an issue control unit is configured to control the rate with which an instruction issue unit issues instructions to an execution pipeline, in order to avoid spikes in power drawn by that execution pipeline. The issue control unit maintains a history buffer that reflects, for N previous cycles, the number of instructions issued during each of those N cycles. If the total number of instructions issued during the N previous cycles exceeds a threshold value, then the issue control unit throttles the instruction issue unit from issuing instructions during a subsequent cycle. In addition, the issue control unit increases the threshold value in proportion to the number of previously issued instructions and based on a variety of configurable parameters. Accordingly, the issue control unit maintains highly granular control over the rate with which the instruction issue unit "ramps up" to a maximum instruction issue rate.

Advantageously, the number of instructions allowed to be issued to the execution pipeline is gradually increased to a maximum value, thereby avoiding voltage droop that could be caused by the sudden execution of many instructions. In addition, the number of instructions allowed to be issued may be reset in response to intermittent stalls in instruction issues, thereby avoiding voltage droop that could be caused by the sudden execution of many instructions following such an intermittent stall.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for controlling a rate at which an instruction issue unit issues instructions to an execution pipeline, the method comprising:
   determining a first integer value that reflects a number of instructions issued by the instruction issue unit to the execution pipeline during a first cycle associated with the instruction issue unit;
   pushing the first integer value onto a history buffer that stores a plurality of integer values, wherein each integer value stored in the history buffer indicates a number of instructions issued by the instruction issue unit to the execution pipeline during a different previous cycle;
   determining that a sum of the integer values stored in the history buffer including the first integer value exceeds a first threshold value, wherein the first threshold value is adjustable and is based on an offset value and a product of a contribution factor and the sum of the integer values stored in the history buffer; and
   in response to determining that the sum of the integer values exceeds the first threshold value, preventing the instruction issue unit from issuing instructions during a second cycle associated with the instruction issue unit.

2. The computer-implemented method of claim 1, further comprising:
   identifying a first portion of the integer values stored in the history buffer, including the first integer value, that were most recently pushed onto the history buffer;
   determining that a sum of the first portion of the integer values exceeds a second threshold value; and
   preventing the instruction issue unit from issuing instructions during the second cycle associated with the instruction issue unit.

3. The computer-implemented method of claim 2, wherein the second threshold value is equal to a fraction of the first threshold value.

4. The computer-implemented method of claim 1, further comprising reducing the rate at which the instruction issue unit issues instructions to the execution pipeline by:
   determining that the first integer value is less than a moving average of the integer values stored in the history buffer, including the first integer value; and
   in response, causing the first threshold value to decrease during the second cycle associated with the instruction issue unit by setting the offset value to zero during the first cycle associated with the instruction issue unit.

5. A computer-implemented method for controlling a rate at which an instruction issue unit issues instructions to an execution pipeline, the method comprising:
   determining a first integer value that reflects a number of instructions issued by the instruction issue unit to the execution pipeline during a first cycle associated with the instruction issue unit;
   pushing the first integer value onto a history buffer that stores a plurality of integer values, wherein each integer value stored in the history buffer indicates a number of instructions issued by the instruction issue unit to the execution pipeline during a different previous cycle;
   determining that a sum of the integer values stored in the history buffer including the first integer value exceeds a first threshold value, wherein the first threshold value is adjusted from an updated value via an offset value;
   increasing the first threshold value by incrementing a moving average of the integer values stored in the history buffer, including the first integer value, by the offset value after a first interval has elapsed; and
   in response to determining that the sum of the integer values exceeds the first threshold value, preventing the instruction issue unit from issuing instructions during a second cycle associated with the instruction issue unit.

6. The computer-implemented method of claim 5, further comprising determining the moving average of the integer values stored in the history buffer by:
   computing a first partial value based on a first contribution factor multiplied by the sum of the integer values stored in the history buffer, including the first integer value;
   computing a second partial value based on a second contribution factor multiplied by a previous value of the moving average; and
   combining the first partial value with the second partial value.

7. The computer-implemented method of claim 6, wherein the second contribution factor is equal to one minus the first contribution factor.

8. The computer-implemented method of claim 6, further comprising reducing the rate at which the instruction issue unit issues instructions to the execution pipeline by:
   determining that the first integer value is less than the moving average; and
   causing the first threshold value to be decreased during the second cycle associated with the instruction issue unit by at least one of setting the first contribution factor to one and setting the offset value to zero during the first cycle associated with the instruction issue unit.

9. The computer-implemented method of claim 6, further comprising reducing the rate at which the instruction issue unit issues instructions to the execution pipeline by:
   determining that the first integer value is less than the moving average of the integer values stored in the history buffer, including the first integer value, by at least a drop threshold value; and
   causing the first threshold value to be decreased during the second cycle associated with the instruction issue unit by resetting the moving average to zero during the first cycle associated with the instruction issue unit.

10. A subsystem configured to control a rate at which an instruction issue unit issues instructions to an execution pipeline, including:
    issue control circuitry configured to:
       determine a first integer value that reflects a number of instructions issued by the instruction issue unit to the execution pipeline during a first cycle associated with the instruction issue unit;
       push the first integer value onto a history buffer that stores a plurality of integer values, wherein each integer value stored in the history buffer indicates a number of instructions issued by the instruction issue unit to the execution pipeline during a different previous cycle;
       determine that a sum of the integer values stored in the history buffer including the first integer value exceeds a first threshold value, wherein the first threshold value is adjustable and is based on an offset value and a product of a contribution factor and the sum of the integer values stored in the history buffer; and
       in response to determining that the sum of the integer values exceeds the first threshold value, prevent the instruction issue unit from issuing instructions during a second cycle associated with the instruction issue unit.

11. The subsystem of claim 10, wherein the issue control circuitry is further configured to:
  identify a first portion of the integer values stored in the history buffer, including the first integer value, that were most recently pushed onto the history buffer;
  determine that a sum of the first portion of the integer values exceeds a second threshold value; and
  prevent the instruction issue unit from issuing instructions during the second cycle associated with the instruction issue unit.

12. The subsystem of claim 11, wherein the second threshold value is equal to a fraction of the first threshold value.

13. The subsystem of claim 10, wherein the issue control circuitry is further configured to increase the first threshold value by incrementing a moving average of the integer values stored in the history buffer, including the first integer value, by the offset value.

14. The subsystem of claim 13, wherein the issue control circuitry is further configured to determine the moving average of the integer values stored in the history buffer by:
  computing a first partial value based on a first contribution factor multiplied by the sum of the integer values stored in the history buffer, including the first integer value;
  computing a second partial value based on a second contribution factor multiplied by a previous value of the moving average; and
  combining the first partial value with the second partial value.

15. The subsystem of claim 14, wherein the second contribution factor is equal to one minus the first contribution factor.

16. The subsystem of claim 14, wherein the issue control circuitry is further configured to reduce the rate at which the instruction issue unit issues instructions to the execution pipeline by:
  determining that the first integer value is less than the moving average; and
  causing the first threshold value to be decreased during the second cycle associated with the instruction issue unit by at least one of setting the first contribution factor to one and setting the offset value to zero during the first cycle associated with the instruction issue unit.

17. The subsystem of claim 14, wherein the issue control circuitry is further configured to reduce the rate at which the instruction issue unit issues instructions to the execution pipeline by:
  determining that the first integer value is less than the moving average of the integer values stored in the history buffer, including the first integer value, by at least a drop threshold value; and
  causing the first threshold value to be decreased during the second cycle associated with the instruction issue unit by resetting the moving average to zero during the first cycle associated with the instruction issue unit.

18. A computing device configured to control a rate at which an instruction issue unit issues instructions to an execution pipeline, including:
  issue control circuitry configured to:
    determine a first integer value that reflects a number of instructions issued by the instruction issue unit to the execution pipeline during a first cycle associated with the instruction issue unit;
    push the first integer value onto a history buffer that stores a plurality of integer values, wherein each integer value stored in the history buffer indicates a number of instructions issued by the instruction issue unit to the execution pipeline during a different previous cycle;
    determine that a sum of the integer values stored in the history buffer including the first integer value exceeds a first threshold value, wherein the first threshold value is adjustable and is based on an offset value and a product of a contribution factor and the sum of the integer values stored in the history buffer; and
    in response to determining that the sum of the integer values exceeds the first threshold value, prevent the instruction issue unit from issuing instructions during a second cycle associated with the instruction issue unit.

19. The computing device of claim 18, wherein the issue control circuitry is further configured to:
  identify a first portion of the integer values stored in the history buffer, including the first integer value, that were most recently pushed onto the history buffer;
  determine that a sum of the first portion of the integer values exceeds a second threshold value; and
  prevent the instruction issue unit from issuing instructions during the second cycle associated with the instruction issue unit.

20. The computing device of claim 19, wherein the second threshold value is equal to a fraction of the first threshold value.

21. The computing device of claim 18, wherein the issue control circuitry is further configured to increase the first threshold value by incrementing a moving average of the integer values stored in the history buffer, including the first integer value, by the offset value.

* * * * *